US012682874B2

(12) United States Patent
Takahashi et al.

(10) Patent No.: US 12,682,874 B2
(45) Date of Patent: Jul. 14, 2026

(54) SOUND PROCESSING DEVICE AND METHOD OF OUTPUTTING PARAMETER OF SOUND PROCESSING DEVICE

(71) Applicant: YAMAHA CORPORATION, Hamamatsu (JP)

(72) Inventors: Yu Takahashi, Hamamatsu (JP); Hayato Yamakawa, Hamamatsu (JP); Yoshifumi Mizuno, Hamamatsu (JP); Takuya Shibata, Hamamatsu (JP); Tatsuki Tashiro, Hamamatsu (JP); Ryohei Takeuchi, Hamamatsu (JP); Yuki Sakamoto, Hamamatsu (JP); Jinichi Konno, Hamamatsu (JP); Yusuke Ota, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 663 days.

(21) Appl. No.: 18/187,235

(22) Filed: Mar. 21, 2023

(65) Prior Publication Data

US 2023/0306944 A1 Sep. 28, 2023

(30) Foreign Application Priority Data

Mar. 24, 2022 (JP) ................................ 2022-047914
Nov. 2, 2022 (JP) ................................ 2022-176011
Nov. 29, 2022 (JP) ................................ 2022-190249

(51) Int. Cl.
*G10H 3/18* (2006.01)
*G10H 1/16* (2006.01)

(52) U.S. Cl.
CPC ............... *G10H 3/187* (2013.01); *G10H 1/16* (2013.01); *G10H 2210/311* (2013.01)

(58) Field of Classification Search
CPC ................................ G10H 3/187; G10H 1/16
See application file for complete search history.

(56) References Cited

U.S. PATENT DOCUMENTS 11,900,902 B2 * 2/2024 Martinez Ramirez .. H04S 3/008
2013/0019739 A1 * 1/2013 Vainiala ............... G10H 1/0091
84/622

(Continued)

FOREIGN PATENT DOCUMENTS

CN 105206280 A 12/2015
JP 2005316173 A 11/2005

(Continued)

OTHER PUBLICATIONS

Office Action issued in Japanese Appln. No. 2022-047914 mailed Jul. 12, 2022. English machine translation provided.

(Continued)

*Primary Examiner* — Olisa Anwah
(74) *Attorney, Agent, or Firm* — ROSSI, KIMMS & McDOWELL LLP

(57) ABSTRACT

A method of outputting a parameter of a sound processing device receives an audio signal, obtains information of the parameter of the sound processing device, which corresponds to the received audio signal, by using a trained model obtained by performing training of a relationship among a training output sound of the sound processing device, a training input sound of the sound processing device, and a parameter of sound processing performed by the sound processing device, the parameter of the sound processing device being receivable by a user of the sound processing device, and outputs obtained information of the parameter of the sound processing device corresponding to the received audio signal.

15 Claims, 13 Drawing Sheets

(56) References Cited

U.S. PATENT DOCUMENTS

| | | | | |
|---|---|---|---|---|
| 2013/0022210 | A1* | 1/2013 | Vainiala | G10H 1/16<br>381/59 |
| 2018/0122347 | A1* | 5/2018 | Zanetti | G10H 3/186 |
| 2020/0153400 | A1 | 5/2020 | Shida et al. | |
| 2020/0236456 | A1* | 7/2020 | Gallo | H04R 1/1008 |
| 2021/0166718 | A1* | 6/2021 | Castro Borquez | G10H 1/0091 |
| 2021/0217396 | A1* | 7/2021 | Sobierajski | G06F 17/142 |
| 2021/0390938 | A1* | 12/2021 | Morsy | G06F 3/0482 |
| 2023/0197043 | A1* | 6/2023 | Martinez Ramirez | G10H 3/187<br>381/61 |
| 2023/0230492 | A1* | 7/2023 | Srinivasan | G09B 5/06 |

FOREIGN PATENT DOCUMENTS

| | | | | |
|---|---|---|---|---|
| JP | 2009086443 | A | * | 4/2009 |
| JP | 2019008333 | A | | 1/2019 |
| JP | 2020076928 | A | | 5/2020 |
| JP | 2020160102 | A | | 10/2020 |

OTHER PUBLICATIONS

Takita. "MIDI tone parameter value estimation of the input instrument audio signal based on deep learning". The Institute of Electronics, Information and Communication Engineers and Information Processing Society of Japan. 13th Information Science and Technology Forum. FIT2014. pp. 271-272. English translation provided.

Notice of Reasons for Refusal issued in Japanese Appln. No. 2022-176011 mailed Aug. 19, 2025. English machine translation provided.

Office Action issued in Chinese Appln. No. 202310241071.X, mailed Jan. 31, 2026. English machine translation provided.

Notice of Reasons for Refusal issued in Japanese Appln. No. 2022-176011 mailed Dec. 2, 2025. English machine translation provided.

"Mustang GT Expanded Manual." Fender homepage, pp. 1-52, 2017. Acquired from <https: //www.fmicassets.com/Damroot/Original/10001/Mustang%20GT%20Expanded%20Manual%20JP.pdf>.

"Fender, a preset supervised by Inoran, Ken and Soichiro Yamauchi appears in a Tone application that can be used to create amplifier sound." Barks, Nov. 16, 2017. Acquired by <https://barks.jp/news/793587/>.

* cited by examiner

FIG.12
102
CRUNCH
CLEAN
BRIT
DRIVE
MASTER
BASS
TREBLE
TONE
501

SOUND PROCESSING DEVICE AND METHOD OF OUTPUTTING PARAMETER OF SOUND PROCESSING DEVICE

CROSS REFERENCE TO RELATED APPLICATIONS

This Nonprovisional application claims priority under 35 U.S.C. § 119(a) on Japanese Patent Application No. 2022-047914 filed on Mar. 24, 2022, Japanese Patent Application No. 2022-176011 filed on Nov. 2, 2022, and Japanese Patent Application No. 2022-190249 filed on Nov. 29, 2022, each of the entire contents of which are hereby incorporated by reference.

BACKGROUND

Technical Field

An embodiment of the present disclosure relates to a sound processing device such as a guitar amplifier and a method of outputting a parameter of the sound processing device.

Background Information

An electronic musical instrument disclosed in Japanese Unexamined Patent Application Publication No. 2020-160102 includes an effect module in which a plurality of effectors are functionally connected in series, a plurality of multipliers disposed on an input side or an output side of each effector constituting the effect module, a RATIO operator as a first operator that orders a change in first characteristics in the effect module, and a calculator of a DSP that collectively and simultaneously varies amplification factors of the plurality of multipliers so that the first characteristics in the effect module become ordered characteristics, in response to an operation of the RATIO operator.

A distortion providing device disclosed in Japanese Unexamined Patent Application Publication No. 2020-76928 includes a first amplifying means that attenuates an input audio signal on the basis of an attenuation factor set by a user and amplifies the attenuated audio signal, a second amplifying means that is serially connected to the first amplifying means, and a limiting means that is connected between an output end of the first amplifying means and an input end of the second amplifying means and limits an input voltage of the second amplifying means to a predetermined distortion voltage. The limiting means determines the distortion voltage on the basis of the attenuation factor.

A musical sound signal processing device disclosed in Japanese Unexamined Patent Application Publication No. 2019-8333, when pitch detection success/failure information is information indicating that the pitch detection is defined as failure, outputs a distortion signal generated by a distortion signal generating means and obtained by processing a musical sound signal to be obtained by a string operation.

Each of the above prior arts corrects an audio signal to a target audio signal by signal processing.

SUMMARY

One aspect of the present disclosure is directed to provide a sound processing device that presents a user a parameter for bringing an input sound close to a target sound in a used sound processing device, and a method of controlling the sound processing device.

A method of outputting a parameter of a sound processing device receives an audio signal, obtains information of the parameter of the sound processing device, which corresponds to the received audio signal, by using a trained model obtained by performing training of a relationship among a training output sound of the sound processing device, a training input sound of the sound processing device, and a parameter of sound processing performed by the sound processing device, the parameter of the sound processing device being receivable by a user of the sound processing device, and outputs obtained information of the parameter of the sound processing device corresponding to the received audio signal.

According to an embodiment of the present disclosure, a parameter for bringing an input sound close to a target sound in a used sound processing device is able to be presented to a user.

DETAILED DESCRIPTION

Figure 1:
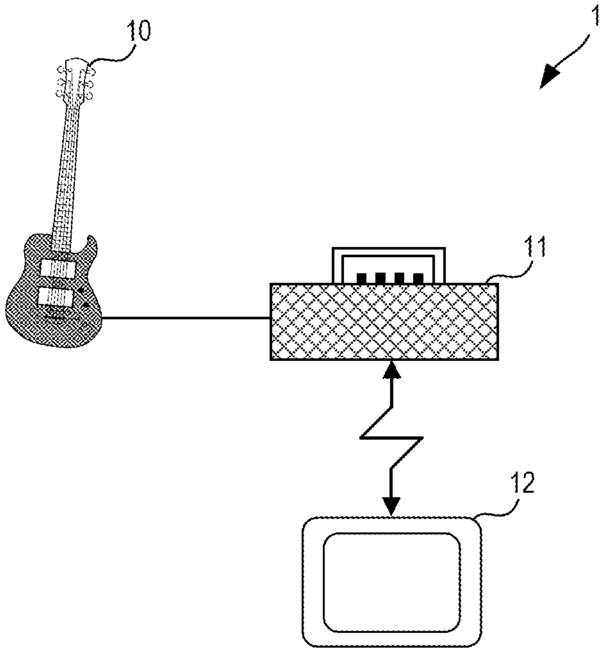
FIG. 1 is a diagram showing a configuration of a sound system 1.

FIG. 1 is an external view showing an example of a sound system 1. The sound system 1 includes an electric guitar 10, a guitar amplifier 11, and a user terminal 12.

The electric guitar 10 is an example of a musical instrument. It is to be noted that, although the present embodiment shows the electric guitar 10 as an example of the musical instrument, the musical instrument is not limited to the electric guitar. The musical instrument may be other string instruments. The musical instrument also includes an electric musical instrument such as an electric bass, an acoustic musical instrument such as a piano and a violin, or an electronic musical instrument such as an electronic piano.

The guitar amplifier 11 is connected to the electric guitar 10 through an audio cable. In addition, the guitar amplifier 11 is connected to the user terminal 12 by wireless communication such as Bluetooth (registered trademark) or a wireless LAN. The electric guitar 10 outputs an analog sound signal according to a performance sound to the guitar amplifier 11. It is to be noted that, in a case in which the musical instrument is an acoustic musical instrument, an audio signal is inputted into the guitar amplifier 11 by use of a microphone or a pickup.

Figure 2:
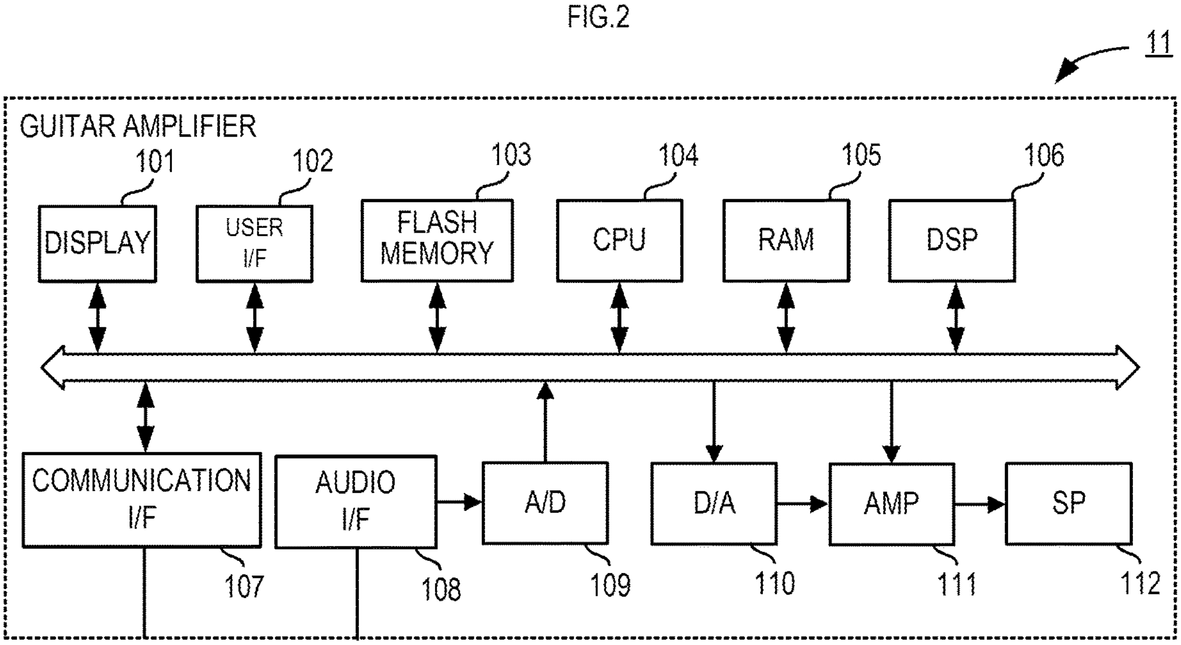
FIG. 2 is a block diagram showing a configuration of a guitar amplifier 11.

FIG. 2 is a block diagram showing a configuration of the guitar amplifier 11. The guitar amplifier 11 includes a display 101, a user interface (I/F) 102, a flash memory 103, a CPU 104, a RAM 105, a DSP 106, a communication I/F 107, an audio I/F 108, an A/D converter 109, a D/A converter 110, an amplifier 111, and a speaker 112.

The display 101 includes an LED, an LCD (Liquid Crystal Display), or an OLED (Organic Light-Emitting Diode), for example, and mainly displays a state of the guitar amplifier 11.

Figure 3:
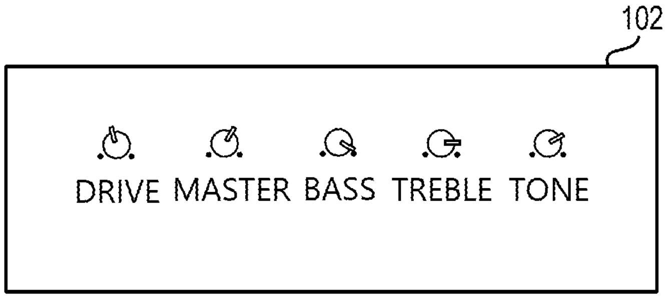
FIG. 3 is an external view showing an example of a user I/F 102.

The user I/F 102 includes a knob, a switch, or a button, and receives an operation from a user. FIG. 3 is an external view showing an example of the user I/F 102. In this example, the user I/F 102 has five knobs. Each of the five knobs is a knob for receiving adjustment of parameters of DRIVE, MASTER, BASS, TREBLE, and TONE.

It is to be noted that, although the present embodiment shows the knob for mainly adjusting a parameter related to distortion as an example of the user I/F 102, the user I/F 102 also includes a physical controller such as a power switch.

The DRIVE is a knob for adjusting strength of distortion. The strength of distortion is increased as the knob of DRIVE is rotated clockwise.

The MASTER is a knob for adjusting an amplification factor of the amplifier 111. The amplification factor of the amplifier 111 is increased as the knob of MASTER is rotated clockwise. In addition, the strength of distortion that occurs in the amplifier 111 is also increased as the knob of MASTER is rotated clockwise.

The BASS is a knob for adjusting strength of a low frequency range. The low frequency range is emphasized as the knob of BASS is rotated clockwise. In addition, the strength of distortion in the low frequency range is also increased as the knob of BASS is rotated clockwise. The TREBLE is a knob for adjusting strength of a high frequency range. The high frequency range is emphasized as the knob of TREBLE is rotated clockwise. In addition, the strength of distortion in the high frequency range is also increased as the knob of TREBLE is rotated clockwise. The TONE is a knob for adjusting brightness of a sound. The brightness of a tone is increased as the knob of TONE is rotated clockwise.

It is to be noted that the user I/F 102 may be a touch panel stacked on the LCD being the display 101. In addition, the user may adjust the parameters such as the above DRIVE, MASTER, BASS, TREBLE, and TONE, through an application program of the user terminal 12. In such a case, the user terminal 12 receives adjustment of a parameter from the user through a touch panel display or the like, and sends information that indicates an amount of adjustment of the parameter, to the guitar amplifier 11.

Figure 4:
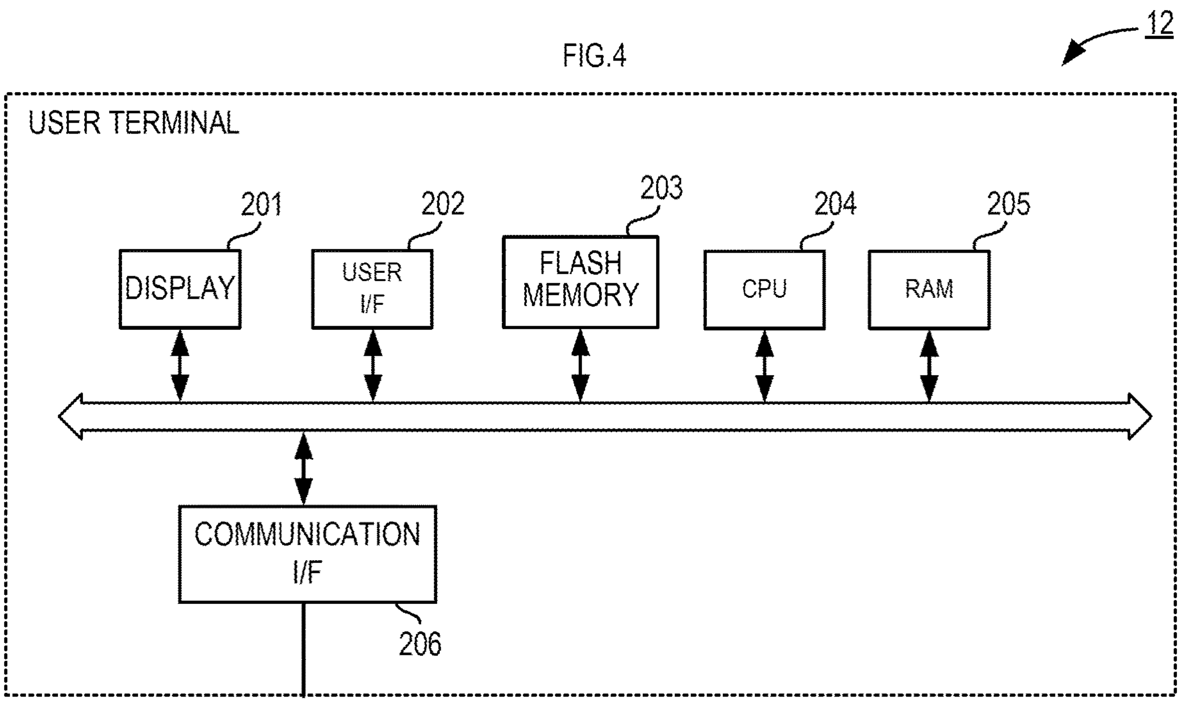
FIG. 4 is a block diagram showing a main configuration of a user terminal 12.
Figure 5:
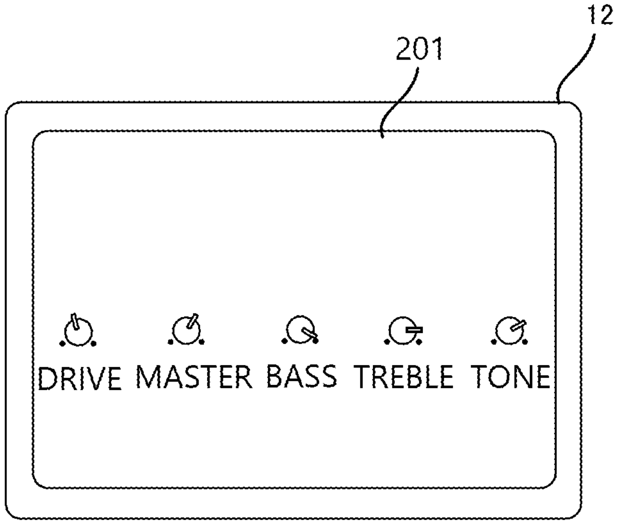
FIG. 5 is an external view of the user terminal 12, showing an example of a display screen according to an application program.

FIG. 4 is a block diagram showing a configuration of the user terminal 12. FIG. 5 is an external view of the user terminal 12, showing an example of a display screen according to an application program.

The user terminal 12 is an information processing apparatus such as a personal computer or a smartphone. The user terminal 12 includes a display 201, a user I/F 202, a flash memory 203, a CPU 204, a RAM 205, and a communication I/F 206.

The display 201 includes an LED, an LCD, or an OLED, for example, and displays various information. The user I/F 202 is a touch panel stacked on the LCD or the OLED being the display 201. Alternatively, the user I/F 202 may be a keyboard, a mouse, or the like. In a case in which the user I/F 202 is a touch panel, the user I/F 202 constitutes a GUI (Graphical User Interface) together with the display 201.

The CPU 204 is an example of a processor and is a controller that controls an operation of the user terminal 12. The CPU 204 reads and implements a predetermined program such as an application program stored in the flash memory 203 being a storage medium to the RAM 205 and performs various types of operations. It is to be noted that the program may be stored in a server (not shown). The CPU 204 may download the program from the server through a network and may execute the program.

The CPU 204, as shown in FIG. 5, constitutes the GUI by displaying icon images of the five knobs (DRIVE, MASTER, BASS, TREBLE, and TONE) in the user I/F 102 of the guitar amplifier 11, on the display 201. The guitar amplifier 11 sends information that indicates current positions of the five knobs through the communication I/F 107. The CPU 204 receives the information from the guitar amplifier 11, and controls the icon images of the five knobs displayed on the display 201.

The user, through the GUI, can operate the icon images of the five knobs (DRIVE, MASTER, BASS, TREBLE, and TONE), and can also adjust a parameter. The CPU 204 receives an operation to the icon images, and sends information on the parameter after the operation is received, to the guitar amplifier 11.

The CPU 104 of the guitar amplifier 11 is an example of a processor. The CPU 104 reads out various programs stored in the flash memory 103 being a storage medium to the RAM 105 and controls the guitar amplifier 11. For example, the CPU 104 receives a parameter according to signal processing from the user I/F 102 or the user terminal 12 as described above, and controls the DSP 106 and the amplifier 111. The DSP 106 and the amplifier 111 correspond to a signal processor of the present disclosure.

The communication I/F 107 is connected to another apparatus such as the user terminal 12 through Bluetooth (registered trademark), a wireless LAN, or the like.

The audio I/F 108 has an analog audio terminal. The audio I/F 108 receives an analog audio signal from the electric guitar 10 through an audio cable.

The A/D converter 109 converts the analog audio signal received by the audio I/F 108 into a digital audio signal.

The DSP 106 performs various types of signal processing such as effect, to the digital audio signal. The parameter according to signal processing is received from the user I/F 102. In the present embodiment, the user, by operating the above five knobs, can change the parameter of the effect in the DSP 106 and can adjust a tone of a sound of the electric guitar 10 to be outputted from the guitar amplifier 11. It is to be noted that the effects include all signal processing that provide a variation to a sound. The parameter corresponding to the above five knobs shown in the present embodiment is a parameter related to distortion effect as an example.

The DSP 106 outputs the digital audio signal on which the signal processing has been performed, to the D/A converter 110.

The D/A converter 110 converts the digital audio signal received from the DSP 106 into an analog audio signal. The amplifier 111 amplifies the analog audio signal. The parameter according to amplification is received through the user I/F 102.

The speaker 112 outputs a performance sound of the electric guitar 10, based on the analog sound signal amplified by the amplifier 111.

Figure 6:
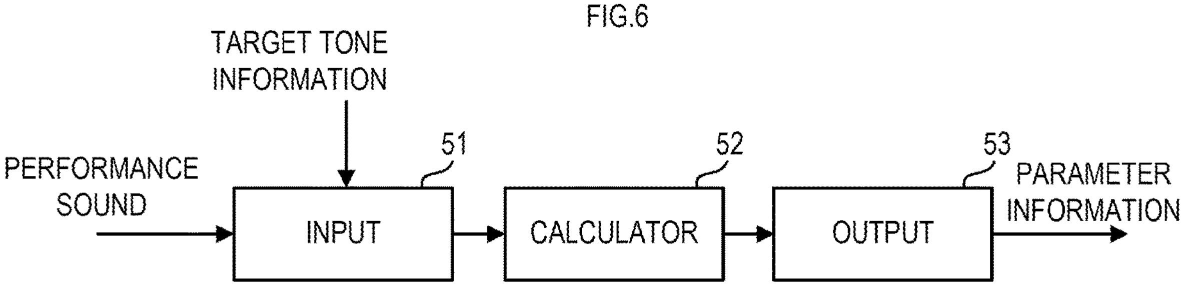
FIG. 6 is a block diagram showing a functional configuration of a method of outputting a parameter that is achieved by a CPU 104 of the guitar amplifier 11.
Figure 7:
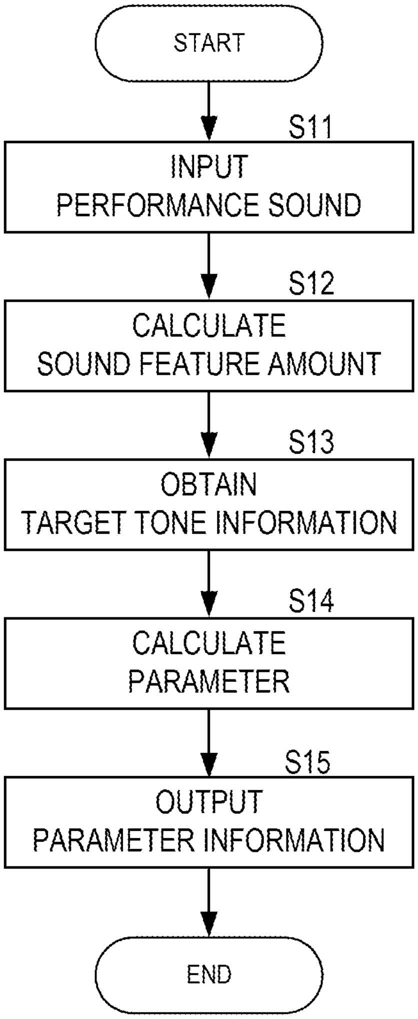
FIG. 7 is a flow chart showing an operation of the method of outputting the parameter.

FIG. 6 is a block diagram showing a functional configuration of a method of outputting a parameter that is achieved by the CPU 104 of the guitar amplifier 11. FIG. 7 is a flow chart showing an operation of the method of outputting the parameter. The CPU 104, by a predetermined program read out from the flash memory 103, constitutes an input 51, a calculator 52, and an output 53 that are shown in FIG. 4.

The input 51 inputs a digital audio signal according to a performance sound of the electric guitar 10 (S11). A user inputs a performance sound into the guitar amplifier 11, for example, by playing all strings or a specific string of the electric guitar 10, on an open string. The calculator 52 obtains a tone (a sound feature amount) of an inputted audio signal (S12).

Figure 8:
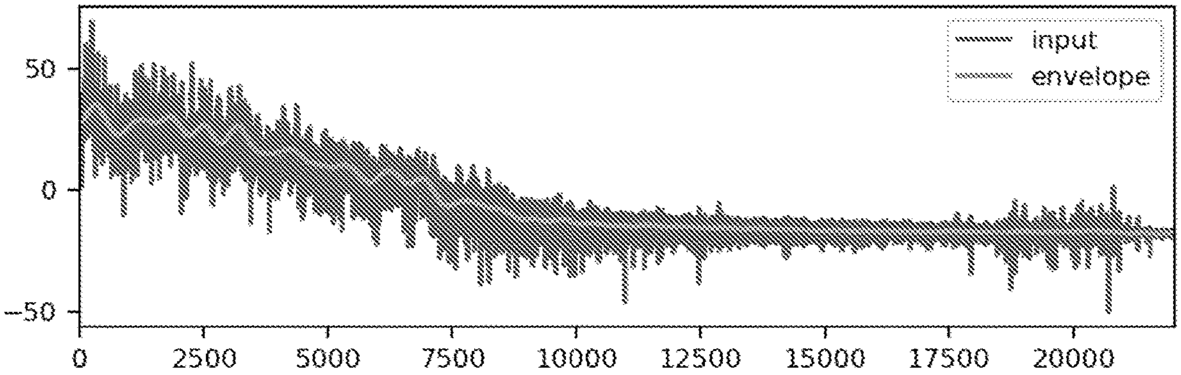
FIG. 8 is a view showing frequency characteristics (input) and spectral envelope (envelope) of an audio signal of an inputted performance sound of an electric guitar 10.

The sound feature amount may be frequency characteristics, for example, and, more specifically, spectral envelope. FIG. 8 is a view showing the frequency characteristics (input) and the spectral envelope (envelope) of an audio signal of an inputted performance sound of the electric guitar 10. The horizontal axis of a graph shown in FIG. 8 indicates a frequency (Hz), and the vertical axis indicates an amplitude. The spectral envelope is obtained, for example, by a linear predictive coding method (Linear Predictive Coding: LPC), a cepstrum analysis method, or the like, from the inputted audio signal. For example, the calculator 52 converts the audio signal into a frequency axis by short-time Fourier transformation, and obtains an amplitude spectrum of the audio signal. The calculator 52 equalizes the amplitude spectrum in a specific period, and obtains an average spectrum. The calculator 52 removes a bias (a zero-order component of cepstrum) being an energy component, from the average spectrum, and obtains the spectral envelope of the audio signal. It is to be noted that either equalization in a time-axis direction or removal of the bias may be performed first. In other words, the calculator 52 may first remove the bias from the amplitude spectrum and then obtain the average spectrum equalized in the time-axis direction as spectral envelope.

Figure 9:
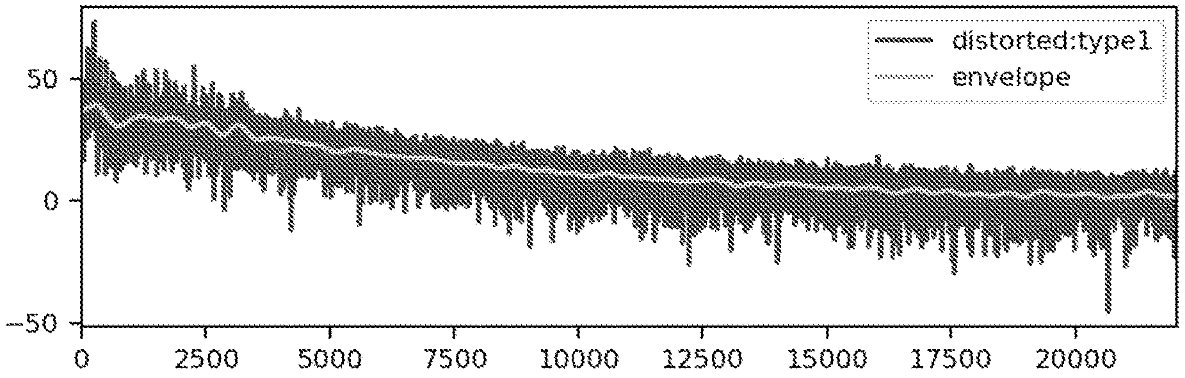
FIG. 9 is a view showing frequency characteristics (distorted: type 1) and spectral envelope (envelope) of an audio signal obtained by performing an effect of a certain distortion on the performance sound of the electric guitar, as target tone information.

The input 51 obtains target tone information (S13). The target tone information is, for example, a sound feature amount of an audio signal according to a performance sound of a certain artist. The sound feature amount may be frequency characteristics, for example, and, more specifically, spectral envelope. FIG. 9 is a view showing frequency characteristics (distorted: type 1) and spectral envelope (envelope) of an audio signal obtained by performing an effect of a certain distortion on a performance sound of an electric guitar, as the target tone information. The horizontal axis of a graph shown in FIG. 9 indicates a frequency (Hz), and the vertical axis indicates an amplitude. The sound feature amount corresponding to the target tone information, by obtaining a performance sound of a specific artist desired by a user from audio content or the like, for example, is calculated from an audio signal of an obtained performance sound. A method of calculating the spectral envelope may be the above linear predictive coding method (Linear Predictive Coding: LPC) or cepstrum analysis method. In addition, the input 51 may obtain spectral envelope calculated by a server through a network.

A user operates the user I/F 102 and inputs, for example, the name of a specific artist as the target tone information. The input 51 obtains the performance sound or sound feature amount of an inputted artist, from the audio content, the server, or the like. Moreover, the input 51 may previously obtain a sound feature amount and may store the sound feature amount in the flash memory 103.

In addition, the user may input the target tone information through the application program of the user terminal 12.

Figure 10:
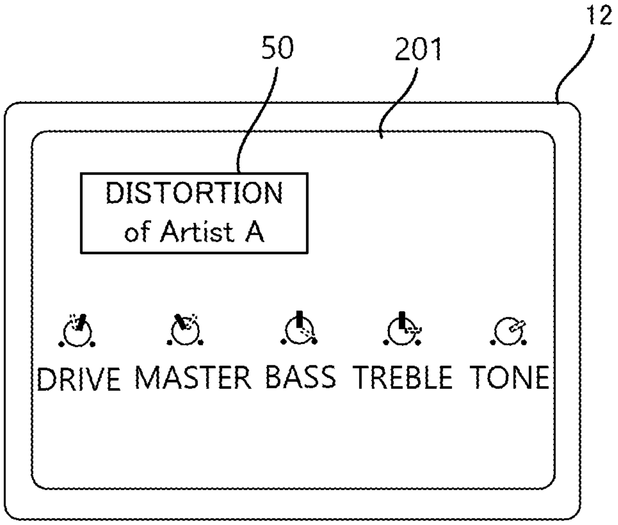
FIG. 10 is an external view of the user terminal 12, showing an example of a display screen according to an application program.

FIG. 10 is an external view of the user terminal 12, showing an example of a display screen according to the application program.

The CPU 204, as shown in FIG. 10, displays a text indicating the target tone information, and icon images of the five knobs (DRIVE, MASTER, BASS, TREBLE, and TONE) in the user I/F 102 of the guitar amplifier 11, on the display 201.

The example of FIG. 10 displays the name "DISTORTION of Artist A" of a certain distortion effect of a certain artist desired by a user, as the target tone information. The display is of a list box 50, so that the user can select a desired artist and effect name out of a large number of artists and a large number of effect names. The CPU 204 obtains a sound feature amount corresponding to selected artist and effect name from the server, and sends the sound feature amount to the guitar amplifier 11.

Subsequently, the calculator 52 calculates a parameter of signal processing for bringing an input performance sound close to a target tone, based on the performance sound inputted by the input 51 and the obtained target tone information (S14).

For example, the calculator 52 calculates a parameter, based on a trained model of a DNN (Deep Neural Network) trained relationship among the sound feature amount according to the performance sound of the electric guitar 10, the target tone information, and the parameter.

Figure 11:
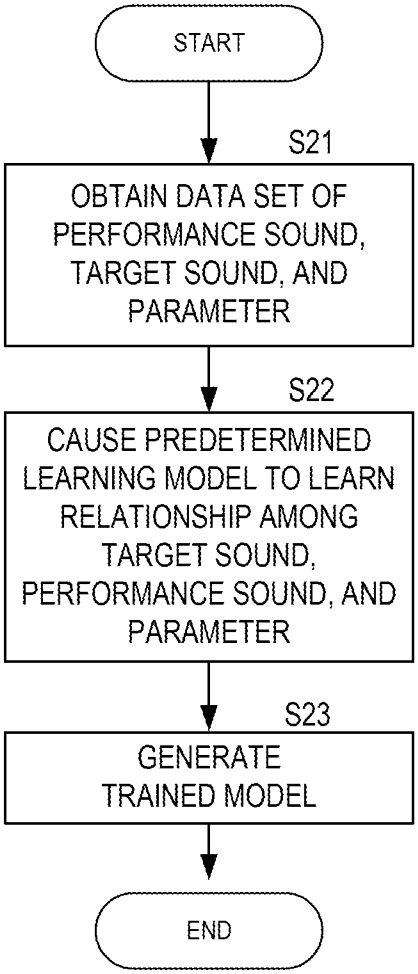
FIG. 11 is a flow chart showing an operation of a method of generating a trained model performed by a generation apparatus of the trained model.

FIG. 11 is a flow chart showing an operation of a method of generating a trained model performed by a generation apparatus of the trained model. The generation apparatus of the trained model is obtained by a program executed by a computer (a server) used by a manufacturer of the guitar amplifier 11 uses, for example.

The generation apparatus of the trained model, as a training phase, obtains a large number of data sets (training data) including a training input sound of the sound processing device, a training output sound of the sound processing device, a parameter of sound processing performed by the sound processing device (S21). The training input sound of the sound processing device is, for example, a performance sound of the electric guitar 10 to be inputted into the guitar amplifier 11 and is a sound without distortion. The training output sound of the sound processing device is a target tone sound, and is, for example, a sound with distortion that a certain artist performs using a certain effect. More specifically, the training input sound of the sound processing device is, for example, a sound feature amount of the performance sound of the electric guitar 10 to be inputted into the guitar amplifier 11, and the training output sound of the sound processing device is a sound feature amount of the target tone. In the present embodiment, the sound feature amount includes a sound feature amount of a distortion sound. More specifically, the sound feature amount of the training input sound of the sound processing device is frequency characteristics (more specifically, spectral envelope) according to an audio signal before distortion, and the sound feature amount of the training output sound of the sound processing device is frequency characteristics (more specifically, spectral envelope) according to the audio signal after distortion.

The parameter of sound processing performed by the sound processing device is a parameter received from a user, and, in the present embodiment, is a parameter of the above five knobs (DRIVE, MASTER, BASS, TREBLE, and TONE) related to distortion in the guitar amplifier 11.

The generation apparatus of the trained model causes a predetermined training model to train a relationship among the sound feature amount of the training input sound of the sound processing device, the sound feature amount of the training output sound of the sound processing device, and the parameter received from a user by the sound processing device, by use of a predetermined algorithm (S22).

An algorithm to cause the training model to train is not limited, but is able to use any machine training algorithm such as a CNN (Convolutional Neural Network) and an RNN (Recurrent Neural Network). The machine training algorithm may include supervised training, unsupervised training, semi-supervised training, reinforcement training, inverse reinforcement training, active training, or transfer training. The calculator 52 may cause the training model to train by use of the machine training model such as HMM (Hidden Markov Model) or SVM (Support Vector Machine).

The sound of the electric guitar 10 to be inputted into the guitar amplifier 11, by the effect of the guitar amplifier 11, is able to be brought close to a target tone sound (a sound when a certain artist plays using a certain effect, for example). In short, the sound of the electric guitar 10 to be inputted into the guitar amplifier 11, the sound when a certain artist plays using a certain effect, and the parameter in effect processing of the guitar amplifier 11 have a correlation. Therefore, the generation apparatus of the trained model causes a predetermined training model to train a relationship among the sound of the electric guitar 10 to be inputted into the guitar amplifier 11, the sound when a certain artist plays using a certain effect, and the parameter in the effect processing of the guitar amplifier 11, and generates a trained model (S23).

It is to be noted that the "training data" is also able to be expressed as "teaching data" or "learning data." In addition, expression such as "training a model" is also able to be expressed as "causing a model to learn." For example, an expression of "a computer trains the training model by use of teaching data" is also able to be replaced with an expression of "a computer causes a learning model to learn by use of learning data."

The calculator 52 obtains a trained model from a generation apparatus (a server of a musical instrument manufacturer, for example,) of the trained model through a network. The calculator 52, in an execution phase, by the trained model, obtains a parameter in the effect processing of the guitar amplifier 11 to bring the performance sound of the electric guitar 10 inputted into the guitar amplifier 11 close to the target tone sound (the sound when a certain artist plays using a certain effect, for example) (S14). Information according to the parameter to be obtained by the calculator 52 is a value in a range that is settable in the guitar amplifier 11. More specifically, the calculator 52 obtains the parameter of the above five knobs (DRIVE, MASTER, BASS, TREBLE, and TONE) of the guitar amplifier 11.

The output 53 outputs the information according to the parameter obtained by the calculator 52 (S15). For example, the output 53 sends the information to the user terminal 12 through the communication I/F 107. The CPU 204 of the user terminal 12 receives the information and displays the parameter on the display 201. For example, the CPU 204, as shown in FIG. 10, displays the icon images of the five knobs (DRIVE, MASTER, BASS, TREBLE, and TONE) in the user I/F 102 of the guitar amplifier 11, on the display 201, and displays a target parameter. In the example of FIG. 10, the CPU 204 displays the target positions of the five knobs (DRIVE, MASTER, BASS, TREBLE, and TONE) in black. In the example of FIG. 10, the CPU 204 shows the current positions of the five knobs by a dashed line.

In this manner, the guitar amplifier 11 according to the present embodiment is able to present a user information according to a parameter of effect for bringing the sound of the electric guitar 10 close to a target tone. As a result, the user, by simply playing the electric guitar 10, can easily determine which and how much parameter in the guitar amplifier 11 is adjusted to bring close to the target tone. The guitar amplifier 11 according to the present embodiment, for example, reproduces a performance sound of a certain artist longed for by the user in a pseudo-simulated manner, and enables the user to experience as if being playing a favorite sound of the user. Specifically, the user of the guitar amplifier 11 can reproduce a distortion sound of a longing artist by the guitar amplifier 11 and can experience as if being playing to a favorite distortion sound of the user.

First Modification

In the above embodiment, as an operation in the training phase, the sound feature amount (more specifically, spectral envelope) of the training input sound and the sound feature amount (more specifically, spectral envelope) of the training output sound are used to train the training model. In addition, the guitar amplifier 11, as an operation in the execution phase, obtains the sound feature amount (more specifically, spectral envelope) according to the performance sound of the electric guitar 10 and the target sound feature amount (more specifically, spectral envelope), and obtains the information according to the parameter received from a user in the sound processing device.

However, the generation apparatus of the trained model may cause the training model to train a relationship among the audio signal of the training input sound, the audio signal of the training output sound, and the parameter received from a user in the sound processing device. The guitar amplifier 11, as an operation in the execution phase, may obtain an audio signal according to the performance sound of the electric guitar 10 and an audio signal of the target tone sound and obtain information according to the parameter received from a user.

It is to be noted the guitar amplifier 11, by using the trained model trained based on the sound feature amount, is able to obtain a result faster and more accurately than in a case of using the trained model trained based on the audio signal.

Second Modification

In the above embodiment, the parameter is displayed on the display 201 of the user terminal 12. However, the guitar amplifier 11 being the sound processing device may display the parameter for bringing close to a target tone, on the display 101. In such a case, the user terminal 12 is not required.

Third Modification

In the above embodiment, as the operation in the execution phase, the guitar amplifier 11 obtains the sound feature amount (more specifically, spectral envelope) according to the performance sound of the electric guitar 10 and the target sound feature amount (more specifically, spectral envelope), and obtains the information according to the parameter received from a user. However, the operation in the execution phase does not need to be performed by the guitar amplifier 11. For example, the user terminal 12, as an operation in the execution phase, may obtain the sound feature amount (more specifically, spectral envelope) according to the performance sound of the electric guitar 10 and the target sound feature amount (more specifically, spectral envelope), and obtain the information according to the parameter received from a user in the sound processing device. It is to be noted that the user terminal 12 may obtain an audio signal from the electric guitar 10 through the guitar amplifier 11. In such a case, the user terminal 12 obtains a sound feature amount of an obtained audio signal, and obtains information according to a parameter.

Fourth Modification

Figure 13:
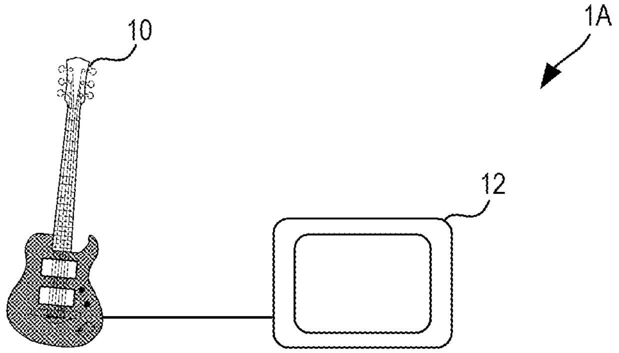
FIG. 13 is a diagram showing a configuration of a sound system 1A.

FIG. 13 is a diagram showing a configuration of a sound system 1A according to a fourth modification. The user terminal 12 of the sound system 1A is directly connected to the electric guitar 10. The user terminal 12 obtains an audio signal from the electric guitar 10 through a not-shown audio I/F. The user terminal 12, as shown in FIG. 10, for example, displays a list box 50 on the display 201, and receives an artist and effect name that are desired by a user, as target tone information. In addition, the user terminal 12 displays the list box 50 on the display 201, and receives information including a model name or the like of the sound processing device such as the guitar amplifier used by a user. The user terminal 12, for each sound processing device, obtains information according to a parameter received from the user by use of the trained model training a relationship among a sound to be inputted, a target tone, and a parameter in the effect processing. The user terminal 12 displays the information according to an obtained parameter, on the display 201. The user, by referring to a displayed parameter, can easily determine which and how much parameter is adjusted in an in-use sound processing device to bring a tone of an own performance sound close to a target tone.

Fifth Modification

A guitar amplifier 11 of a fifth modification performs generation of a trained model being the training phase shown in FIG. 11 and an output of parameter information being the execution phase shown in FIG. 7. In short, one apparatus may perform the operation in the training phase of the training model, and the operation in the execution phase of the trained model. In addition, not only the guitar amplifier 11 but a server may perform generation of the trained model being the training phase and an output of the parameter information being the execution phase. In such a case, the guitar amplifier 11, through a network, may send the sound feature amount of the performance sound of the electric guitar 10, and target tone information, to the server, and receive the parameter information from the server.

Sixth Modification

Figure 12:
FIG. 12 is an external view showing an example of a user I/F 102 according to a sixth modification.

FIG. 12 is an external view showing an example of a user I/F 102 according to a sixth modification. In this example, the user I/F 102 has a selection knob 501 of a sound processing model, in addition to the five knobs.

The guitar amplifier 11 has a plurality of sound processing models obtained by modeling input-output characteristics of a plurality of sound processing devices. In the example of FIG. 12, a sound processing model of any of the selection knob 501, CLEAN, CRUNCH, or BRIT is selected. The CLEAN is a sound processing model to output a clear sound with low distortion with respect to an inputted sound. The CRUNCH is a sound processing model to output a sound with slight distortion with respect to an inputted sound. The BRIT is a sound processing model to output a sound with high distortion with respect to an inputted sound. The guitar amplifier 11, by use of a selected sound processing model, performs sound processing on a performance sound of the electric guitar 10 that is inputted into the guitar amplifier 11.

The parameter according to the sixth modification includes information to designate a sound processing model to be used, among the plurality of sound processing models. The generation apparatus of the trained model, as the training phase, causes the training model to train the relationship among the training input sound of the sound processing device, the training output sound of the sound processing device, the parameter including the sound processing model used in the sound processing device. The guitar amplifier 11, as the execution phase, obtains a parameter including the sound processing model to be used in the guitar amplifier 11 and to bring the performance sound of the electric guitar 10 that is inputted into the guitar amplifier 11 close to a target tone, by the trained model.

As a result, the user can easily determine which sound processing model is selected and which and how much parameter is adjusted to bring close to the target tone.

The description of the present embodiments is illustrative in all points and should not be construed to limit the present disclosure. The scope of the present disclosure is defined not by the foregoing embodiments but by the following claims. Further, the scope of the present disclosure is intended to include all modifications within the scopes of the claims and within the meanings and scopes of equivalents.

For example, although the above embodiment shows the guitar amplifier 11 as an example of the sound processing device, the sound processing device is not limited to the guitar amplifier 11. For example, all devices that perform sound processing, such as a powered speaker, an audio mixer, or an electronic musical instrument are included in the sound processing device of the present disclosure.

In addition, in a case in which the user terminal 12 executes an application program that performs sound processing, the user terminal 12 also functions as the sound processing device of the present disclosure. For example, the user terminal 12 may execute an application program such as DAW (Digital Audio Workstation) for performing editing work of an audio signal. The application program such as DAW may input an audio signal of a plurality of tracks including a performance sound of a player, and may perform effect processing on the audio signal of each truck. In such a case, the application program such as DAW inputs an audio signal and obtains information according to a parameter received from a user in the sound processing device from an inputted audio signal, by use of the trained model. The application program such as DAW displays the information according to an obtained parameter, on the display 201. The user, by referring to a displayed parameter, can easily determine which and how much parameter is adjusted to bring the audio signal of each track close to a target tone.

It is to be noted that the application programs such as DAW may obtain an audio signal from the electric guitar 10 through the guitar amplifier 11, may directly obtain an audio signal from the electric guitar 10 as shown in FIG. 13, or may obtain an audio signal according to a performance sound, from a storage apparatus such as the flash memory 203 or recording data stored in a server or the like.

The above embodiment shows the spectral envelope as an example of the sound feature amount. However, the sound feature amount may be power, fundamental frequency, formant frequency, or mel spectrum, for example. In other words, any type of sound feature amount, as long as being related to a tone, may be used.

Although, as an example of the effect, the present embodiment shows distortion, the effect is not limited to distortion and may be another effect such as a chorus, a compressor, delay, or reverb.

In the above embodiment, the calculator 52 calculates the parameter based on the trained model obtained by training the relationship among the sound feature amount according to the performance sound of the electric guitar 10, the target tone information, and the parameter. However, the calculator 52 may calculate a parameter with reference to a table that defines the relationship among the sound feature amount according to the performance sound of the electric guitar 10, the target tone information, and the parameter. The table is previously registered in a database in the flash memory 103 of the guitar amplifier 11 or a not-shown server.

As a result, the guitar amplifier 11 is able to present a user information according to a parameter of effect for bringing the sound of the electric guitar 10 close to a target tone, without using an artificial intelligence algorithm.

What is claimed is:

1. A sound processing device comprising:

a memory configured to store computer-executable instructions;

an input that receives an audio signal; and a processor configured to execute the computer-executable instructions stored in the memory to implement, the processor being received the audio signal from the input and obtained information of a parameter of the sound processing device corresponding to the received audio signal by using a trained model obtained by performing training by a predetermined learning model of a relationship among a training output sound of the sound processing device, a training input sound of the sound processing device, and a parameter of sound processing performed by the sound processing device, the parameter of the sound processing device being receivable by a user of the sound processing device; and an output that outputs the obtained information of the parameter of the sound processing device corresponding to the received audio signal, wherein:

the training includes processing to train a relationship among a sound feature amount of the training output sound, a sound feature amount of the training input sound, and the parameter of sound processing performed by the sound processing device; and a calculator obtains a sound feature amount of the received audio signal, and obtains the information of the parameter of the sound processing device based on the sound feature amount and by using the trained model.

2. The sound processing device according to claim 1, wherein:

the training input sound corresponds to a performance sound of a musical instrument;

the training output sound corresponds to a target tone sound of the musical instrument;

the parameter of the sound processing device corresponds to the parameter of the sound processing performed by the sound processing device and is configured to bring the performance sound of the musical instrument closer to the target tone sound of the musical instrument;

the output causes the obtained information of the parameter of the sound processing device to be displayed on a display; and the sound processing device further comprises:

a user interface that receives the parameter of the sound processing device from the user; and a signal processor that performs the sound processing on the received audio signal based on the parameter of the sound processing device received by the user interface.

3. The sound processing device according to claim 1, wherein the sound feature amount includes a sound feature amount of a distortion sound.

4. The sound processing device according to claim 3, wherein the sound feature amount includes frequency characteristics according to a pre-distorted audio signal or a post-distorted audio signal.

5. The sound processing device according to claim 3, wherein the distortion sound is a distortion sound of performance of a string instrument.

6. The sound processing device according to claim 1, wherein the sound feature amount includes a spectral envelope.

7. The sound processing device according to claim 1, wherein:

the sound processing performed by the sound processing device includes effect processing; and the parameter of the sound processing device includes a parameter of the effect processing.

8. The sound processing device according to claim 1, wherein the information of the parameter of the sound processing device obtained by the calculator indicates a value in a range that is settable in the sound processing device.

9. The sound processing device according to claim 1, wherein:

the sound processing device has a plurality of sound processing models obtained by modeling input-output characteristics of a plurality of sound processing devices; and the parameter of the sound processing device includes information to designate a sound processing model to be used from among the plurality of sound processing models.

10. A method of outputting a parameter of a sound processing device, the method comprising:

receiving an audio signal;

obtaining information of the parameter of the sound processing device, which corresponds to the received audio signal, by using a trained model obtained by performing training by a predetermined learning model of a relationship among a training output sound of the sound processing device, a training input sound of the sound processing device, and a parameter of sound processing performed by the sound processing device, the parameter of the sound processing device being receivable by a user of the sound processing device; and outputting the obtained information of the parameter of the sound processing device corresponding to the received audio signal, wherein:

the training includes processing to train a relationship among a sound feature amount of the training input sound, a sound feature amount of the training output sound, and the parameter of sound processing performed by the sound processing device; and a sound feature amount of the received audio signal is obtained, and the information of the parameter of the sound processing device is obtained, based on the sound feature amount and by using the trained model.

11. The method of outputting a parameter of the sound processing device according to claim 10, wherein the sound feature amount includes a sound feature amount of a distortion sound.

12. The method of outputting a parameter of the sound processing device according to claim 11, wherein the sound feature amount includes frequency characteristics according to a pre-distorted audio signal or a post-distorted audio signal.

13. The method of outputting a parameter of the sound processing device according to claim 10, wherein the sound feature amount includes a spectral envelope.

14. The method of outputting a parameter of the sound processing device according to claim 10, wherein:

the sound processing performed by the sound processing device includes effect processing; and the parameter of the sound processing device includes a parameter of the effect processing.

15. The method of outputting a parameter of the sound processing device according to claim 10, wherein:

the sound generating device has a plurality of sound processing models obtained by modeling input-output characteristics of a plurality of sound processing devices; and the parameter of the sound processing device includes information to designate a sound processing model to be used from among the plurality of sound processing models.

* * * * *